Jan. 9, 1968   A. A. DEDOES   3,362,586
BARBECUE FAN AND FIRE QUENCHING ACCESSORY
Filed Sept. 2, 1965
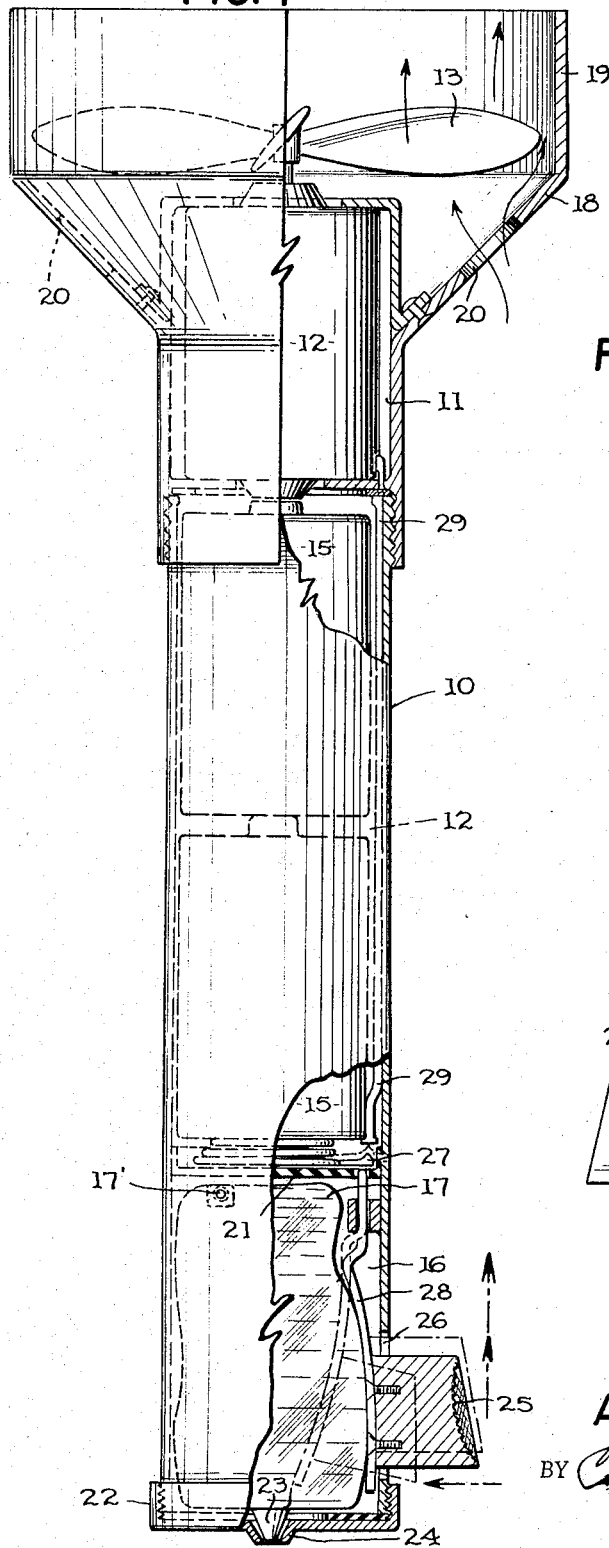
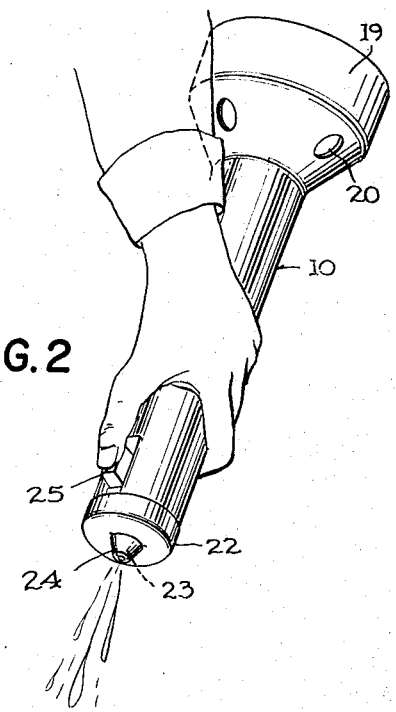
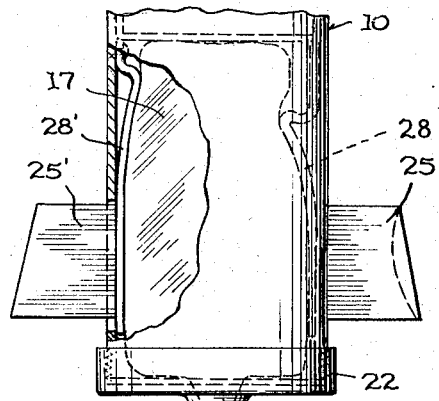
INVENTOR
Arnold A. Dedoes
BY

United States Patent Office 3,362,586
Patented Jan. 9, 1968

3,362,586
BARBECUE FAN AND FIRE QUENCHING ACCESSORY
Arnold A. Dedoes, 2070 W. Eleven Mile Road, Berkley, Mich. 48072
Filed Sept. 2, 1965, Ser. No. 484,571
1 Claim. (Cl. 222—103)

This invention relates to barbecue apparatus and more particularly to a barbecue accessory which shall be useful in the operation of a barbecue fire grate or broiler.

Barbecue grates both of the stationary and portable home type for use in the backyard or patio usually employed ordinary fuels such as coal, charcoal or wood chips to provide the necessary small fire to do the required cooking. Most frequently the cooking consists of broiling various kinds of meat, such as steaks and the like, where it is desired to control the fire with great exactness. Heretofore, the intensity or the heat of the fire has been controlled or concentrated at a particular area of the grate by the use of separate manually operated fans or quenching apparatus such as a water pistol which may project a small stream of water at a particular place to control the heat of the fire. Such apparatus usually has consisted of a separate fan to supply air needed to hasten the burning of the fuel and when a region of the fire bed under the grade gets too hot, that region is retarded by the application of a quenching fluid, such as water, delivered in a small stream from a squirt gun or the like.

One important object of the present invention is to provide a barbecue accessory which shall combine in a unitary casing apparatus wherein the directed air supply for the barbecue grate and the necessary quenching fluid shall control or concentrate the required heat at the desired locale of the grate by a single implement capable of being held in one hand and leaving the other hand for use to handle cooking utensils and the like.

Another object of the invention is to provide a unit assemblage of manually directed air supply and quenching fluid shall be contained in a single hand-operated casing so that each element shall be under the control of a single operating device for alternate and/or individual operation by one hand of the barbecue attendant.

A further object of the invention is to provide a single casing implement which shall provide for the support and delivery of an air supply device at one end portion of the casing and the support and delivery of a small quenching fluid stream at the opposite end portion of the casing.

A further object of the invention is to provide a compact hand accessory for an operator of a barbecue grate fire which shall be conveniently available for a single handed operation to control the air and fuel required for the efficient operation of any particular barbecue cooking operation.

A further object of the invention is to provide an accessory assemblage which shall be simple in construction and arrangement to facilitate the manipulation thereof.

These and other objects of the invention will be more manifest from the following specification and drawings and specifically set forth in the claims.

In the drawings:

FIGURE 1 is a front view partially in section of an accessory embodying the invention;

FIG. 2 is a perspective view of the apparatus shown in FIGURE 1, manually operated; and FIGURE 3 is an enlarged fragmentary view showing an alternate form of operating fluid dispenser bag in the casing.

Referring to FIGURE 1 in the drawings there is shown an ordinary flashlight handle casing 10 of tubular form which includes separate interior spaced or compartments for containing the several cooperating parts of the novel form of barbecue accessory. This casing 10 may be made of any suitable material such as molded plastic, fibrous insulation material or sheet metal, as well known in the art.

The casing generally is indicated by numeral 10 and is preferably divided into an upper section or compartment 11 which includes a battery operated electric motor 12 and a shaft connected fan 13 operated thereby; a middle compartment 14 for housing electric batteries 15—15 and a lower compartment 16 for accommodating a flexible walled fluid container or squeeze receptacle indicated by the number 17 and hereinafter more fully described for dispensing and directing a small stream of fluid from the handle casing. For example, this bag may be made of self-sustaining flexible walled material collapsible by steady pressure and returned to full position by the inherent nature of the flexible material. The container 17 is also provided with a suitable closure vent valve cap member 17' to facilitate refilling the container 17 from any suitable source of supply fluid. Whichever form of refilling is employed, the desired purpose of the bag 17 is to supply a desired stream of fluid by pumping action or intermittent pressure application to the container walls to dispense the fluid in a controlled manner.

The upper end of the casing 10 is also provided with a screw-threaded bell shaped extension 18 which in effect forms an extension of the first compartment 11 and includes a deflector shield or housing for motor fan blades 13. The fan is preferably protected by a shroud extension 19 provided with suitable vent apertures 20—20 for supplying adequate air to the fan during its operation.

The middle section 11 of the casing 10 is arranged to contain batteries 15—15 for supplying an electric current source for operating the motor 12 through the well known circuit connection for a flashlight.

The lower portion of the casing 10 includes a compartment 16 formed by a suitable partition 21 mounted therein and separating the fan operating parts of the apparatus from a refillable fluid-ejecting container 17 located in the lower portion of the casing. The lower portion of the casing 10 is closed by a suitable screw cap 22 and thus it will be noted that all parts of the casing 10 may be made accessible by the removal of the bottom cap 22 and the top screw-threaded extension 18 for housing the motor-fan elements 12 and 13.

Also included in the lower compartment portion 16 of the casing is the container 17 for holding an adequate supply of a fluid, such as water, to provide the desired quenching action of the barbecue fire whenever the same is needed as hereinafter more fully described. The collapsible container 17 is preferably made of rubber or a suitable plastic and includes an appropriate self-closing resilient nozzle valve 23 of suitable pin-hole like diameter and located in the bottom wall of container 17. This nozzle is centrally positioned with respect to the casing 10 so as to project through an appropriate opening 24 formed therein and thus be capable of directing a controlled stream of quenching fluid from the casing. The accessory is designed to be compact in form and handled as an ordinary flashlight handle casing, as well understood in the art, so that the same may be grasped in the hand of an operator, as shown in FIGURE 2, and completely manipulated thereby.

One of the primary features of the invention is to provide a motor operated fan for delivering a steady and controlled stream of air to the barbecue fire grate so as to control the burning of any fuel therein and if the burning is too rapid, then a quenching fluid may be immediately applied to the specific area and thus tend to a minimum any burning or scorching of the food being cooked at that time. The operating mechanism for alternating the operation of both the fan and the quenching fluid consists of a manually operated spring pressed knob 25 projecting from a slotted opening 26 in the casing. This knob 25 has two movements, a vertical reciprocatory movement for operating an electrical switch member 27 to control the fan motor circuit and a horizontal or transverse movement to exert the desired pressure on the flexible walls of the bag 17 to eject a fluid stream therefrom. By providing the knob 25 with two movements, vertically to make electric circuit contact with a sliding motion and horizontally moving in and out to exert pressure on the fluid container 17, both operations are accomplished as the occasion may require. The electric circuit to the motor 12 is controlled by the switch contact member 27 operated to complete the circuit through the series connected batteries and the motor 12. The "in and out" or transverse movement of the knob 25 is also employed to apply pressure to the squeeze bag 17 to eject or dispense a small stream of fluid from the flexible wall container nozzle 23 whenever necessary and independently of the motor switch 27.

The particular electrical circuit for the motor 12 includes a leaf spring 28 supporting the knob 25 and movable with respect to switch contact 27 and a conductor strip 29 leading to the motor 12 in the upper portion of the casing and grounded to the casing shell 10.

Referring to FIGURE 3, there is provided an alternate form of fluid dispenser wherein two opposed spring pressed buttons 25–25' mounted on separate spring members 28 and 28' for applying greater pressure pumping action to the flexible material bag 17 and thus enabling a greater quantity of fluid to be ejected from the apparatus whenever necessary to effect a greater sustained stream of quenching fluid ejected from the casing. The pumping action may also be effective to facilitate refilling the flexible walled bag when refilling by inserting the nozzle 23 in a supply reservoir, as well known in the art.

While I have shown a preferred embodiment of a hand-operated device for supplying air or a controlled stream of fire-quenching fluid to a barbecue fire grate, it is obvious that various changes may be made therein without departing from the invention as specifically defined in the appended claims.

I claim:

1. The combination of a hand-held device incorporating a battery powered fan at one end, a resilient dispensing container with nozzle at the other end, and an operating member movable in one direction to compress the dispensing container to dispense the contents and movable in another direction to close a switch thus completing a circuit to energize the battery powered fan.

References Cited

UNITED STATES PATENTS

| | | | |
|---|---|---|---|
| 1,357,261 | 11/1920 | Svoboda | 230—259 |
| 1,850,008 | 3/1932 | Gore | 239—327 X |
| 2,629,516 | 2/1953 | Badham | 222—192 X |
| 3,099,386 | 7/1963 | Pieper | 230—249.5 |

ROBERT B. REEVES, *Primary Examiner.*

F. R. HANDREN, *Assistant Examiner.*